March 30, 1943.   W. T. KNAUTH   2,314,991
VISCOSIMETER
Filed Jan. 13, 1942
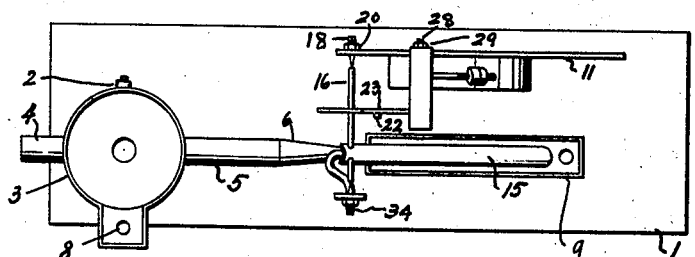
Fig. 2.
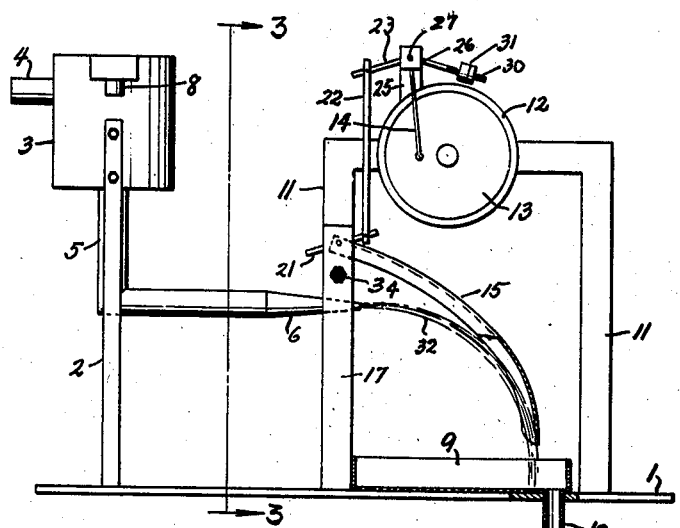
Fig. 1.
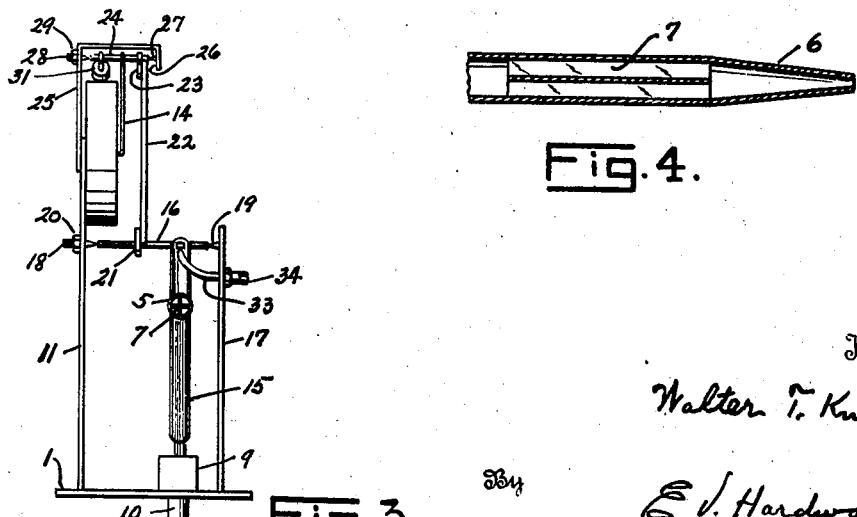
Fig. 4.
Fig. 3.
Inventor
Walter T. Knauth
By
E. V. Hardway
Attorney Patented Mar. 30, 1943

2,314,991

UNITED STATES PATENT OFFICE 2,314,991

VISCOSIMETER

Walter T. Knauth, Houston, Tex., assignor to The Milwhite Company Inc., a corporation Application January 13, 1942, Serial No. 426,578

7 Claims. (Cl. 265—11)

This invention relates to a viscosimeter and has been particularly designed to continuously record the viscosity of a liquid.

One object of the invention is to provide apparatus of the character described which will make a continuous record of the viscosity of rotary drilling muds—that is, mud laden fluid which is pumped down through a drill pipe and allowed to return to the surface between the drill pipe and well bore in the process of drilling a well with rotary drilling tools.

Another object of the invention is to provide a viscosimeter embodying a movable baffle, a stylus, a record receiving element and operative connections between the baffle and stylus whereby a record of the movements of the baffle is made on the record receiving element with means for continuously projecting a stream of the liquid against the baffle.

The viscosity of rotary drilling fluid is important to the operator as its value is indicative of such characteristics as per cent solids, pumpability and others affecting rate of drilling.

The common apparatus used by drilling operators to determine viscosity is a marsh funnel viscosimeter which is manually operated, usually by the driller helper who periodically makes this viscosity test. The march funnel comprises a funnel shaped container having a restricted opening at the bottom from which the mud flows into a graduated container. Time observations are made for a given amount of drilling fluid to flow from the funnel through the restricted opening. It is obvious that the viscosity thus measured in seconds required for a given amount of drilling fluid to flow from the funnel is in reality a measure of velocity of flow through the restricted opening. The present invention embodies a mechanical arrangement whereby the velocity of a similar flow, which may be considered comparable to viscosity, can be continuously recorded. This is accomplished by allowing the viscosimeter nozzle to project the stream of drilling fluid horizontally against the movable baffle which in turn actuates a stylus to make a record on a record receiving element. To effect continuous operation of the apparatus, a constant head reservoir is maintained which is equipped with an overflow and which is continuously supplied with drilling fluid directly from the well and from which a stream of drilling fluid is continuously projected in horizontal direction against the baffle.

With the above and other objects in view the invention has particular relation to novel features of construction, operation and arrangement of parts, an example of which is given in this specification and illustrated in the accompanying drawing, wherein:

Figure 1 shows a side elevation of the apparatus.

Figure 2 shows a plan view.

Figure 3 shows an end elevation, partly in section, taken on the line 3—3 of Figure 1, and Figure 4 shows an enlarged longitudinal sectional view of the nozzle.

Referring now more particularly to the drawing wherein like numerals of reference designate similar parts in each of the figures, the numeral 1 designates a suitable base upstanding from which are standards as 2 which support a reservoir 3 at the required elevation above the base. The drill fluid is conducted from the well into the reservoir through a suitable pipe 4 and flows therefrom through the conductor pipe 5 which terminates in a horizontally directed nozzle 6 which is preferably restricted toward its discharge end. Within the conductor pipe 5 and upstream from the nozzle 6, there is a straightening vane 7 to cause stream line flow from the nozzle, that is, to neutralize the whirling of the ejected stream. Excess flow entering the reservoir 3 is relieved through an overflow 8 so that there will be a constant head pressure.

The liquid ejected from the nozzle 6 is finally delivered to the trough 9 and is returned to the mud pit through a return pipe 10 and the overflow from the reservoir 3 may also be returned to said pit. Also upstanding from the base 1, there is a frame 11 on which is mounted a mechanical recorder 12 which includes a movable record receiving element 13 and stylus 14. The stylus moves back and forth across the record receiving element in accordance with the movement of the baffle 15 as hereinafter explained. The upper end of the baffle 15 is fixed to a transverse shaft 16.

Upstanding from the base 1 and spaced from the frame 11, there is a standard 17. As indicated in Figure 1, the frame 11 is of an approximately inverted U-shape with the recorder 12 supported by the transverse bar of said frame. The standard 17 is in transverse alignment with one of the legs of the frame 11 as shown in Figures 1 and 3 and said leg 11 and standard 17 support the pin bearings 18, 19 which extend inwardly and support the respective ends of the shaft 16 whereby the baffle is nicely mounted to pivot. The pin bearing 18 may be threaded through the leg of the frame 11 and secured at any selected point of adjustment by the lock nut 20. The pin bearing 19 is fixed to the standard 17.

Fixed to the shaft 16, there is a lever 21 and there is a link 22 whose lower end is pivoted to one end of said lever and whose upper end is pivoted to the free end of the arm 23 which in turn is fixed to the rotatable shaft 24.

Fastened to and upstanding from the crossbar of the frame 11 there is a bracket 25 whose upper end is turned transversely with its free portion 26 downwardly turned. The downwardly turned free portion 26 has an inwardly directed pin point bearing 27 fixed thereto and supporting one end of the shaft 24 and the other end of said shaft 24 is supported by a pin point bearing 28 threaded through the bracket 25 and secured at any selected point of adjustment by the lock nut 29.

Fastened to the shaft 24 and extending outwardly therefrom in a direction opposite to that of the arm 23, there is a rod 30 which is outwardly threaded and screwed onto which there is an adjustable weight 31. The stylus 14 is fixed, at its upper end, to the shaft 24.

The reservoir 3 is kept filled with the drilling fluid. A stream of liquid as 32 will be projected outwardly in a horizontal direction from the nozzle 6 and will strike against the baffle 15. This baffle is arcuate from end to end and is curved in cross-section. The liquid will therefore strike the concaved side of the baffle and will fall on down into the trough 9.

As the viscosity of the liquid varies, the force of the stream 32 against the baffle will correspondingly vary, causing a variation in the position of the baffle. As the baffle moves, the stylus will also correspondingly move through the linkage above described and a record of the stylus movements will be made on the record receiving element 13, thus accurately indicating variations in the viscosity of the liquid above or below the desired standard.

In order to keep the trough of the baffle moist so as to prevent the solid material in the liquid from adhering to and drying on the baffle, a nozzle 33 has been provided with its discharge end directed into the trough of the baffle near its upper end. Clean liquid is supplied through this nozzle 33 from any suitable source through a hose as 34. Only sufficient clean fluid is supplied to the baffle to keep it cleansed, the weight of the cleansing fluid adhering to the baffle not being sufficient to affect the accuracy of its operation.

The drawing and description merely, are illustrative, while the broad principle of the invention will be defined by the appended claims.

What I claim is:

1. A continuous recording viscosimeter comprising a horizontally fixed viscosimeter tube, means for supplying a liquid to the tube under constant, gravitational, linear head pressure, a baffle pivoted to move with variations of the parabolic curves of the liquid stream from the viscosimeter tube projected thereon and effective to actuate a stylus to make a record of the viscosity.

2. A continuous recording viscosimeter comprising a constant linear head reservoir, a nozzle placed horizontally and effective to project a liquid stream, having a velocity in proportion to viscosity of the liquid, means for supplying liquid from the reservoir to the nozzle under constant, gravitational, linear head, a straightening vane interposed in the line between said constant head reservoir and said viscosimeter nozzle, to assure stream line flow, a baffle movable in accordance with the velocity of the projected liquid stream, and a mechanical recorder responsive to the movement of the baffle.

3. A viscosimeter comprising a reservoir and a liquid conductor leading from the reservoir and terminating in an approximate horizontally disposed nozzle arranged to project a stream variable in its path in accordance with variations in velocity, means for maintaining a constant vertical head pressure at the nozzle, a movably mounted baffle arranged in the path of said stream ejected from the nozzle and varying in its position in accordance with variations in the path of the liquid stream, a record making device and means operatively connecting the baffle with the record making device, whereby the record will vary in accordance with said variations in velocity.

4. A viscosimeter comprising an arcuate trough-like baffle pivotally connected to a support, a record making device, means connecting the baffle to the record making device, whereby a record will be made of the movements of the baffle, and means for projecting a stream of the liquid, to be measured, in parabolic curves against the baffle, said pivotal point being so located as to be substantially common to the tangents of the various parabolic curves at the point of contact with the baffle, whereby the baffle will be caused to move in accordance with said curves.

5. A continuous recording viscosimeter comprising a tube extending approximately horizontally, means for supplying the liquid to be tested to said tube with a constant gravitational linear head pressure, a baffle pivoted to move in accordance with variations in the path of the liquid stream projected thereagainst from the tube, a movable record receiving element and a stylus operatively connected with the baffle and actuated thereby to make a record on said element.

6. A continuous recording viscosimeter comprising an approximately horizontal tube terminating in a nozzle, a baffle pivoted to move in accordance with variations in the path of the liquid stream from the tube projected thereon, means for supplying liquid to the tube under an approximately constant gravitational linear head pressure, means for supplying a lubricant to the baffle to effect removal of deposits therefrom, and a mechanical record making device connected with and actuated by the baffle.

7. A viscosimeter comprising an approximately horizontal nozzle, means for supplying a liquid, having a constant vertical head, to the nozzle under head pressure, said nozzle being arranged to project a liquid stream having a muzzle velocity which varies with the viscosity of the liquid, thereby producing variations in the parabolic path of the stream, a baffle mounted to move in accordance with said variations, a record making device and means operatively connecting the baffle with the record making device whereby the record will vary in accordance with variations in the viscosity of the liquid.

WALTER T. KNAUTH.